United States Patent [19]
Sustic et al.

[11] Patent Number: 5,302,675
[45] Date of Patent: Apr. 12, 1994

[54] HIGH TENSILE STRENGTH AMORPHOUS 1-BUTENE/PROPYLENE COPOLYMERS

[75] Inventors: Andres Sustic; George C. Allen, both of Odessa, Tex.

[73] Assignee: Rexene Corporation, Dallas, Tex.

[21] Appl. No.: 941,916

[22] Filed: Sep. 8, 1992

[51] Int. Cl.$^5$ .................. C08F 210/06; C08F 4/654
[52] U.S. Cl. .................... 526/125; 526/348.6
[58] Field of Search .................. 526/125, 348.6

[56] References Cited

U.S. PATENT DOCUMENTS

| | | | |
|---|---|---|---|
| 3,923,758 | 12/1975 | Carter et al. | 526/348.6 |
| 4,168,361 | 9/1979 | Oda et al. | 526/348.6 |
| 4,347,158 | 8/1982 | Kaus et al. | |
| 4,451,688 | 5/1984 | Kuroda et al. | 526/125 |
| 4,736,002 | 4/1988 | Allen et al. | |
| 4,847,340 | 7/1989 | Allen et al. | |
| 4,859,757 | 8/1989 | Allen et al. | |

FOREIGN PATENT DOCUMENTS 335484 10/1989 European Pat. Off. .

*Primary Examiner*—Edward J. Smith
*Attorney, Agent, or Firm*—Harold E. Meier

[57] ABSTRACT

A process for the production of propylene/1-butene copolymers comprising:
  reacting propylene and 1-butene monomers in the presence of a catalyst system comprising:
  (a) a solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0.
  (b) a trialkylaluminum co-catalyst, having from 1 to 9 carbon atoms in each alkyl group in an amount such that the Al/Ti ratio is between about 50:1 and about 500:1.
  (c) an alkoxy silane component of the formula $R_n Si(OR')_{4-n}$ where $n=1-3$, R=aryl or alkyl and $R'=C_{1-3}$ alkyl in a sufficient quantity such that the molar ratio of organoaluminum co-catalyst to alkoxy silane is in the range from about 20:1 to about 45:1.
  said copolymer being characterized by a propylene content of 25 to 50 wt%, a 1-butene content of 75 to 50 wt% and a tensile strength of at least 300 psig.

19 Claims, No Drawings

HIGH TENSILE STRENGTH AMORPHOUS 1-BUTENE/PROPYLENE COPOLYMERS

TECHNICAL FIELD

This invention relates to substantially improved amorphous propylene/1-butene copolymers that exhibit high tensile strength and storage modulus. The copolymers have properties which make them applicable for use in a variety of applications including adhesives, sealants, coatings and similar materials.

BACKGROUND OF THE INVENTION

Amorphous polyalphaolefins are presently used in a wide variety of applications including adhesives, sealants and coatings. Additionally, these materials may be blended with other materials to achieve a wide range of desired physical properties. Amorphous polyalphaolefin polymers and processes for making such polymers are disclosed in U.S. Pat. Nos. 4,859,757, 4,847,340 and 4,736,002, the disclosures of which are incorporated herein for all purposes.

There has, however, arisen a need for improved materials with enhanced physical properties. The present invention provides a substantially amorphous propylene/1-butene copolymer that exhibits high tensile strength and storage modulus. The enhanced physical properties of the copolymers of the present invention substantially broadens the range of applications in which amorphous polyalphaolefin polymers may be used.

SUMMARY OF THE INVENTION

The present invention provides novel propylene/1-butene copolymers and a process for making the copolymers. The copolymers of the present invention comprise from about 25 to 50 wt% propylene and 75 to 50 wt% of 1-butene and have excellent tensile strength and storage modulus properties. The copolymers are completely soluble in boiling heptane and do not exhibit any trace of heat of fusion. The copolymers are produced with a catalyst system comprising a solid supported catalyst component, an organoaluminum co-catalyst and an alkoxy silane component. The alkoxy silane is added to the reactor in a quantity such that the molar ratio of the concentration of the organoaluminum co-catalyst to the alkoxy silane component is 20:45, or more preferably 35:45.

DETAILED DESCRIPTION

The present invention provides substantially amorphous propylene/1-butene copolymers comprising from 25 to 50% propylene and from about 75 to 50 wt% of 1-butene. The propylene and 1-butene monomers are polymerized at a temperature between about 130° F. and about 150° F. and a reactor pressure sufficient to maintain the monomers in the liquid phase. The molecular weight of the copolymers may be controlled by the addition of an appropriate amount of a chain terminating agent, for example from about 1.0 to about 2.0 mol% hydrogen based on the monomer feed to the process. The polymerization reaction takes place in the presence of a catalyst system comprising:

(a) a solid catalyst component as described in U.S. Pat. No. 4,736,002 modified to exclude the use of added electron donors during the preparation of the catalyst component.

(b) a trialkylaluminum co-catalyst component having from 1 to 9 carbon atoms in each alkyl group in a sufficient quantity to provide an Al/Ti ratio in the range from about 50:1 to about 500:1 and (c) an alkoxy silane external component of structure $R_nSi(OR')_{4-n}$ where $n=1-3$, $R=$ aryl or alkyl and $R'=C_{1-3}$ alkyl in a sufficient quantity such that the molar ratio of organoaluminum co-catalyst to alkoxy silane is in the range from about 20:1 to about 45:1.

The alkoxy silane is described as an external component since it is added to the reactor independently of the solid catalyst component and the organoaluminum co-catalyst. Although the polymerization can be carried out in a batch reactor, it is preferred to utilize a continuous process. Usually, pressures in the range of 250 psig and 350 psig are suitable for maintaining the monomers in liquid phase.

The addition of an electron donor such as an alkoxy silane would normally be expected to promote the formation of crystalline polymer. However, it was discovered that within a certain ratio of organoaluminum co-catalyst to an external alkoxy silane, substantially amorphous copolymers of propylene and 1-butene with exceptional tensile properties and storage modulus could be produced.

The polymerization is carried out in a stirred reactor at average residence times between 1 hour and 3 hours. Sufficient catalyst quantities are fed to the reactor to result in a polymer content in the reactor slurry of from 10 wt% to about 50 wt%. The reactor effluent is withdrawn from the reactor, and unreacted monomer is flashed from the recovered product polymer.

The solid supported catalyst component has a molar ratio of magnesium chloride to aluminum chloride of about 8:0.5–3.0 and preferably about 8:1.0–1.5. The molar ratio of magnesium chloride to titanium tetrachloride is between about 8:0.1–8:1.0 and preferably about 8:0.4–8:0.6.

The solid catalyst component may be prepared by the general methods described in U.S. Pat. No. 4,347,158, the disclosure of which is incorporated herein for all purposes, except that these methods must be modified to exclude the use of electron donor compounds in the preparation of the catalyst. Briefly, the modified method involves co-comminuting magnesium chloride and aluminum trichloride in the absence of an electron donor and then co-comminuting the catalyst support so formed with titanium tetrachloride, also in the absence of an electron donor. More specifically, the solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.4 to about 8:1.

The solid catalyst component is used in conjunction with a trialkylaluminum co-catalyst, having from 1 to 9 carbon atoms in each alkyl group. The preferred organoaluminum co-catalyst is triethylaluminum. The molar ratio of trialkylaluminum co-catalyst to titanium-containing catalyst component, i.e., Al/Ti ratio, should range between about 50:1 and about 500:1, preferably between about 120:1 and about 170:1.

The alkoxy silane component is introduced as a dilute solution in heptane. The molar ratio of alkyl aluminum co-catalyst to alkoxy silane, e.g., the Al/Si ratio, should range between 20 and 45, preferably between about 35:1 and about 45:1. Alkoxy silanes suitable for use in connection with the present invention include cyclohexyl methyl dimethoxy silane (CMDMS) and phenyl triethoxy silane (PES). Cyclohexyl methyl dimethoxy silane and phenyl triethoxy silane are available from Huels America, Inc. Piscataway, N.J. 08855-0456. Other alkoxy silanes anticipated to be suitable for use in the practice of the present invention include dimethyl diethoxy silane, dodecyl triethoxy silane, methyl phenyl diethoxy silane, dimethyl diisopropenoxy silane, methyl octyl dimethoxy silane and methyl triethoxy silane.

Due to the high activity of the catalyst system employed in the present invention, the process is highly efficient and typically results in polymer production ranging from about 3000 to 6000 lbs. polymer/lb. titanium catalyst/hour. The propene/1-butene copolymers of the present invention have no determinable heat of fusion, as determined by Differential Scanning Calorimetry techniques (DSC), an indication of the amorphous nature of the polymer and the lack of crystallinity in the polymer structure.

The propene/1-butene copolymers of the present invention have excellent properties making them useful in a variety of applications, such as blending components for adhesives, caulking and sealing compounds and others. Important product properties include melt viscosity, ring and ball softening point, tensile strength and elastic or storage modulus.

The melt viscosity at 375° F. is determined by ASTM test method D-3236 using a Brookfield RVT Viscometer and a #27 spindle. For hot melt adhesives the desired viscosity range is between about 1000 and 12,000 cps at 375° F.

The ring and ball softening point determination is carried out using ASTM E-28 test method. One variable affecting the softening point is butene-1 content of the polymer. A decrease in the butene-1 content causes an increase in the ring and ball softening point.

The tensile strength determination is carried out using ASTM D-638 test method. Typically, the tensile strength values of the copolymers of this invention range from about 300 to about 900 psig (2.1 and 6.2 Mpa, respectively). Copolymers having such high tensile strength are produced when the Al/Si ratio is maintained with the range of from about 20:1 to about 45:1.

The storage or elastic modulus is determined by ASTM D-4440 test method using a Boelin Reology CSM rheometer. The storage modulus is a measure of the elasticity of a material. The storage modulus values of the copolymers of this invention range from about 8.0 to about 14.0 Mpa.

Another indication of the amorphous nature of the copolymers of the present invention is the lack of crystalline polymer as evidenced by the fact that the copolymers contain no heptane insoluble material. Heptane insolubles were determined by Soxhlet extraction of a sample of the copolymer with boiling heptane for six hours.

The invention will be further described with respect to the following examples; however, the scope of the invention is not to be limited thereby.

EXAMPLES 1-3

Polymerization of propylene and 1-butene was performed in a 200 gallon jacketed continuous pilot plant reactor. The temperature of the reactor was controlled by circulating cooling water in the reactor jacket. The solid supported titanium tetrachloride catalyst component was prepared in accordance with the foregoing description and had a titanium content of from about 2.3 to about 2.7 wt %. Slurries containing twenty five wt% of the solid catalyst component were prepared in degassed petrolatum. Five wt % alkyl aluminum co-catalyst solutions were prepared in normal heptane as were 0.5 wt % alkoxy silane component solutions.

The alkyl aluminum co-catalyst solution and catalyst slurry were introduced into the reactor continuously, as were hydrogen, propylene and butene-1 monomers and the alkoxy silane solution.

Copolymers recovered were tested as described above. The pertinent operating conditions and test results are set forth in Table 1 below.

TABLE 1

| EXAMPLE NO. | 1 | 2 | 3 |
|---|---|---|---|
| Reactor Temp., °F. | 140 | 140 | 140 |
| Reactor Pres., psig | 250 | 250 | 240 |
| Triethylaluminum, mol/hr | 0.27 | 0.27 | 0.27 |
| CMDMS mol/hr | 0.0077 | 0.0062 | 0.0062 |
| Propylene, lbs/hr | 24 | 23 | 22 |
| Butene-1, lbs/hr | 106 | 107 | 108 |
| Hydrogen, lbs/hr | 1.8 | 1.6 | 1.7 |
| Al/Ti, mol ratio | 130 | 145 | 170 |
| Al/Si, mol ratio | 35 | 42 | 42 |
| Catalyst Activity, lbs/lbs cat./hr* | 4800 | 5900 | 6300 |
| Butene-1 content, wt % | 62 | 62 | 63 |
| Melt Viscosity, cps | 6550 | 10350 | 12050 |
| Ring and Ball Softening Point, °F. | 200 | 202 | 200 |
| Heat of fusion, J/g | 0 | 0 | 0 |
| Tensile Strength, psig | 650 | 875 | 875 |
| % Elongation @ Break | 300 | >669 | 615 |
| Storage Modulus, Mpa | 11 | 11.4 | 12.9 |
| Glass Transition, °C. | −39 | −39 | −38 |
| Heptane Insolubles | 0 | 0 | 0 |

*Based upon solid catalyst component consumption.

The foregoing examples illustrate the production of an amorphous propylene/1-butene copolymer possessing exceptional tensile and storage modulus properties.

The following example illustrates the use of phenyl triethoxy silane (PES) as an external component. Propylene and 1-butene monomers were polymerized using the same catalyst system and under the operating conditions as Examples 1-3 except that phenyl triethoxy silane (PES) was substituted for cyclohexyl methyl dimethoxy silane (CMDMS).

Pertinent operating conditions and test results are set forth in Table 2 below.

TABLE 2

| EXAMPLE NO. | 4 |
|---|---|
| Reactor Temp., °F. | 140 |
| Reactor Pres., psig | 200 |
| Triethylaluminum mol/hr | 0.29 |
| PES mol/hr | 0.0076 |
| Propylene, lbs/hr | 24 |
| Butene-1, lbs/hr | 106 |
| Hydrogen, lbs/hr | 1.0 |
| Al/Ti, mol ratio | 150 |
| Al/Si, mol ratio | 38 |
| Catalyst Activity, lbs/lbs cat./hr | 5200 |
| Butene-1 content, wt % | 63 |
| Melt Viscosity, cps | 8300 |
| Ring and Ball Softening Point, °F. | 193 |
| Heat of fusion, J/g | 0 |
| Tensile Strength, psig | 670 |

TABLE 2-continued

| EXAMPLE NO. | 4 |
|---|---|
| % Elongation @ Break | 300 |
| Storage Modulus, Mpa | 12 |
| Glass Transition, °C. | −35 |
| Heptane Insolubles | 0 |

As indicated above, the copolymer produced evidenced the desired high tensile strength, elongation at break and storage modulus properties.

In order to demonstrate the significance of the Al/Si ratio, copolymers were also prepared without the alkoxy silane and at Al/Si ratios of 50 and 100 under the same operating conditions and using the same catalyst system as in Examples 1-3, except that the Al/Si ratio was varied.

Table 3 summarizes the pertinent operating conditions and the results of physical testing.

TABLE 3

| EXAMPLE NO. | 5 | 6 | 7 |
|---|---|---|---|
| Reactor Temp., °F. | 135 | 140 | 140 |
| Reactor Pres., psig | 124 | 185 | 170 |
| Triethylaluminum mol/hr | 0.21 | 0.21 | 0.21 |
| CMDMS mol/hr | 0 | 0.0020 | 0.0040 |
| Propylene, lbs/hr | 26 | 25 | 25 |
| Butene-1, lbs/hr | 106 | 105 | 105 |
| Hydrogen, lbs/hr | 0.90 | 0.90 | 1.7 |
| Al/Ti, mol ratio | 150 | 165 | 150 |
| Al/Si, mol ratio | — | 100 | 50 |
| Catalyst Activity, lbs/lbs cat./hr | 7900 | 9600 | 8300 |
| Butene-1 content, wt % | 68 | 69 | 68 |
| Melt Viscosity, cps | 8000 | 5250 | 10500 |
| Ring and Ball Softening Point, °F. | 190 | 177 | 176 |
| Heat of fusion, J/g | 0 | 0 | 0 |
| Tensile Strength, psig | 46 | 65 | 92 |
| % Elongation @ Break | 107 | 270 | 120 |
| Storage Modulus, Mpa | N.D. | 2.7 | 3.3 |
| Glass Transition, °C. | −20 | −33 | −33 |
| Heptane Insolubles | 0 | 0 | 0 |

As indicated above, the use of the alkoxy silane in an amount resulting in a Al/Si ratio outside of the desired range of 20:1 to 45:1 resulted in the production of copolymers that did not exhibit the high tensile strength and storage modulus observed in Examples 1-4.

The following examples further illustrate the significance of the Al/Si ratio in the practice of the present invention. Polymerization of propylene and 1-butene was carried out under the same operating conditions as Examples 1-3 except that the alkoxy silane was added at a rate such that the Al/Si ratio was 20:1 and 30:1.

TABLE 4

| EXAMPLE NO. | 8 | 9 |
|---|---|---|
| Reactor Temp., °F. | 140 | 140 |
| Reactor Pres., psig | 310 | 315 |
| Triethylaluminum mol/hr | 0.27 | 0.27 |
| CMDMS mol/hr | 0.013 | 0.0087 |
| Propylene, lbs/hr | 25 | 24 |
| Butene-1, lbs/hr | 105 | 106 |
| Hydrogen, lbs/hr | 2.2 | 1.9 |
| Al/Ti, mol ratio | 130 | 202 |
| Al/Si, mol ratio | 20 | 30 |
| Catalyst Activity, lbs/lbs cat./hr | 3500 | 3600 |
| Butene-1 content, wt % | 50 | 52 |
| Melt Viscosity, cps | 6650 | 5900 |
| Ring and Ball Softening Point, °F. | 240 | 225 |
| Heat of fusion, J/g | 0 | 0 |

TABLE 4-continued

| EXAMPLE NO. | 8 | 9 |
|---|---|---|
| Tensile Strength, psig | 700 | 550 |
| % Elongation @ Break | >660 | 470 |
| Storage Modulus, Mpa | N.D. | N.D. |
| Glass Transition, °C. | −34 | N.D. |
| Heptane Insolubles | N.D. | N.D. |

As indicated above, when the alkoxy silane was added at a rate such that the molar ratio of triethylaluminum to alkoxy silane was 20:1 and 30:1, the resulting copolymer exhibited the desired high tensile strength and elongation at break.

While particular embodiments of the present invention have been illustrated and described, it will be apparent to those skilled in the art that various changes and modifications may be made without departing from the spirit and scope of the invention.

What is claimed is:

1. A process for the production of an amorphous propylene/1-butene copolymers comprising:
   reacting propylene and 1-butene monomers in the presence of a catalyst system comprising:
   (a) a solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0.
   (b) a trialkylaluminum co-catalyst, having from 1 to 9 carbon atoms in each alkyl group in an amount such that the Al/Ti ratio is between about 50:1 and about 500:1.
   (c) an alkoxy silane component in a sufficient quantity such that the molar ratio of organoaluminum co-catalyst to alkoxy silane is in the range from about 20:1 to about 45:1;
   said amorphous copolymer being characterized by a propylene content of 25 to 50 wt% and 1-butene content of 75 to 50 wt%.

2. The process of claim 1 wherein the propylene and 1-butene monomers are polymerized at a temperature of from 130° F. to 150° F.

3. The process of claim 1 wherein the propylene and 1-butene monomers are polymerized at pressure from 250 psig to 350 psig.

4. The process of claim 1 wherein the alkoxy silane is selected from the group of alkoxy silanes of the formula $R_nSi(OR')_{4-n}$ where n=1-3, R=aryl or alkyl and R'=$C_{1-3}$ alkyl.

5. The process of claim 1 wherein the alkoxy silane is selected from the group consisting of cyclohexyl methyl dimethoxy silane and phenyl triethoxy silane.

6. The process of claim 1 wherein the alkoxy silane is selected from the group consisting of dimethyl diethoxy silane, dodecyl triethoxy silane, methyl phenyl diethoxy silane, dimethyl diisopropenoxy silane, methyl octyl dimethoxy silane and methyl triethoxy silane.

7. The process of claim 1 wherein the copolymer is characterized by a tensile strength of at least 300 psig.

8. A process for the production of an amorphous propylene/1butene copolymers comprising:

reacting propylene and 1-butene monomers in the presence of a catalyst system comprising:
(a) a solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0.
(b) a trialkylaluminum co-catalyst, having from 1 to 9 carbon atoms in each alkyl group in an amount such that the Al/Ti ratio is between about 50:1 and about 500:1.
(c) an alkoxy silane component of the formula $R_nSi(OR')_{4-n}$ where $n=1-3$, $R=$aryl or alkyl and $R'=C_{1-3}$ alkyl in a sufficient quantity such that the molar ratio of organoaluminum co-catalyst to alkoxy silane is in the range from about 20:1 to about 45:1;
said amorphous copolymer being characterized by a propylene content of 25 to 50 wt%, a 1-butene content of 75 to 50 wt% and a tensile strength of at least 300 psig.

9. The process of claim 8 wherein the propylene and 1-butene monomers are polymerized at a temperature of from 130° F. to 150° F.

10. The process of claim 8 wherein the propylene and 1-butene monomers are polymerized at pressure from 250 psig to 350 psig.

11. The process of claim 8 wherein the alkoxy silane is selected from the group consisting of cyclohexyl methyl dimethoxy silane and phenyl triethoxy silane.

12. The process of claim 8 wherein the alkoxy silane is selected from the group consisting of dimethyl diethoxy silane, dodecyl triethoxy silane, methyl phenyl diethoxy silane, dimethyl diisopropenoxy silane, methyl octyl dimethoxy silane and methyl triethoxy silane.

13. A copolymer comprising:
from 25 to 50 wt% propylene and from 75 to 50 wt% 1-butene characterized by a tensile strength of greater than 300 psig;
said copolymer containing no heptane insolubles and being further characterized by having no detectable heat of fusion.

14. The copolymer of claim 14 wherein the copolymer is produced by the process comprising:
reacting propylene and 1-butene monomers in the presence of a catalyst system comprising:
(a) a solid supported catalyst component is prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0.
(b) a trialkylaluminum co-catalyst, having from 1 to 9 carbon atoms in each alkyl group in an amount such that the Al/Ti ratio is between about 50:1 and about 500:1.
(c) an alkoxy silane component in a sufficient quantity such that the molar ratio of organoaluminum co-catalyst to alkoxy silane is in the range from 20:1 to about 45:1.

15. The copolymer of claim 14 wherein the copolymer is produced by polymerizing propylene and 1-butene monomers are polymerized at a temperature of from 130° F. to 150° F.

16. The copolymer of claim 14 wherein the copolymer is produced by polymerizing and 1-butene monomers are polymerized at pressure from 250 psig to 350 psig.

17. The copolymer of claim 14 wherein the copolymer is produced with an alkoxy silane selected from the group of alkoxy silanes of the formula $R_nSi(OR')_{4-n}$ where $n=1-3$, $R=$aryl or alkyl and $R'=C_{1-3}$.

18. The copolymer of claim 14 wherein the copolymer is produced with an alkoxy silane selected from the group consisting of cyclohexyl methyl dimethoxy silane and phenyl triethoxy silane.

19. The copolymer of claim 14 wherein the copolymer is produced with an alkoxy silane selected from the group consisting of dimethyl diethoxy silane, dodecyl triethoxy silane, methyl phenyl diethoxy silane, dimethyl diisopropenoxy silane, methyl octyl dimethoxy silane and methyl triethoxy silane.

* * * * *